(12) United States Patent
Thomas et al.

(10) Patent No.: US 8,622,422 B1
(45) Date of Patent: Jan. 7, 2014

(54) AIRBAG ASSEMBLY WITH HEAT SHIELD

(75) Inventors: Bryan Thomas, Sterling Heights, MI (US); Chang-Hwan Ju, Rochester, MI (US)

(73) Assignee: Key Safety Systems, Inc., Sterling Heights, MI (US)

(*) Notice: Subject to any disclaimer, the term of this patent is extended or adjusted under 35 U.S.C. 154(b) by 0 days.

(21) Appl. No.: 13/610,373

(22) Filed: Sep. 11, 2012

(51) Int. Cl.
*B60R 21/16* (2006.01)

(52) U.S. Cl.
USPC .......................... 280/730.2; 280/736

(58) Field of Classification Search
USPC ............... 280/730.2, 736, 740, 741, 743.1
See application file for complete search history.

(56) References Cited

U.S. PATENT DOCUMENTS

| | | | | |
|---|---|---|---|---|
| 5,944,342 | A * | 8/1999 | White, Jr. et al. | 280/729 |
| 6,270,113 | B1 * | 8/2001 | Wipasuramonton et al. | 280/730.2 |
| 6,802,526 | B2 * | 10/2004 | Dumbrique et al. | 280/728.2 |
| 7,195,273 | B2 * | 3/2007 | Lewis et al. | 280/728.2 |
| 7,445,238 | B2 * | 11/2008 | Marriott | 280/740 |
| 7,618,060 | B2 | 11/2009 | Harvey et al. | |
| 7,669,886 | B2 * | 3/2010 | Astrom | 280/729 |
| 8,408,582 | B2 * | 4/2013 | Lunt et al. | 280/728.2 |
| 2012/0056410 | A1 | 3/2012 | Yamamoto | |

FOREIGN PATENT DOCUMENTS

JP  9086333 A  3/1997

* cited by examiner

*Primary Examiner* — Faye M. Fleming
(74) *Attorney, Agent, or Firm* — Markell Seitzman

(57) ABSTRACT

An airbag assembly (10) has an airbag (40), a tubular inflator (20) and a rolled heat shield (50) wrapped about the inflator (20) and interposed between the inflator (20) and the airbag (40). The rolled heat shield (50) completes at least one full wrap around and encircling a portion of the inflator (20) wherein the portion of the inflator wrapped by the heat shield (50) includes one or more gas outlets (24). The heat shield (50) preferably is a fabric material.

11 Claims, 5 Drawing Sheets

AIRBAG ASSEMBLY WITH HEAT SHIELD

FIELD OF THE INVENTION

This invention relates to airbag assemblies generally, more particularly to an assembly with a heat shield and diffuser combination affixed to an inflator.

BACKGROUND OF THE INVENTION

Gas generators are commonly used to provide inflation gas to fill the inflatable cushion or airbag. These inflators come in a variety of shapes and sizes. Some use pressurized fluids contained inside the inflator, some use solid propellants, others use a combination of both of these.

When the solid propellant is ignited using an electrical discharge to fire a squib, large amounts of inflation gases are generated very quickly. The inflator rapidly experiences a high pressure and rapid heating. Hot gases are expelled through outlets and fill the airbag rapidly. In addition to the hot gases burning particles and small debris also can be expelled. In some cases internal filters are used to capture the debris. The internal surface of the cushion is often coated with a heat resistant barrier to protect the cushion. In many cases the inflator is placed in a housing structure to secure the inflator and further protect the cushion airbag and the surrounding area.

In seat airbag designs, the inflator is tubular in shape. This inflator is held by a steel stamped retainer bracket and clamp ring with clinched studs and locking washers as shown in prior art FIG. 1. This assembly requires several components that contribute to cost and assembly complexity.

It is an object of the present invention to eliminate components and to provide a superior heat shield protection against hot gases and burning particles. It is a further objective to have this heat shield function as a diffuser that can allow gases to be directed outwardly to fill the cushion.

These and other objectives are achieved by the present invention as described and shown.

SUMMARY OF THE INVENTION

An airbag assembly has an airbag, a tubular inflator and a rolled heat shield wrapped about the inflator and interposed between the inflator and the airbag. The rolled heat shield completes at least one full wrap around and encircling a portion of the inflator wherein the portion of the inflator wrapped by the heat shield includes one or more gas outlets. The heat shield preferably is a fabric material.

The fabric material can be made in layers or wrapped about the inflator a plurality of times to form layers. The inner layers are sacrificial layers destroyed as inflation gases are expelled. The fabric material has a 840 denier or greater.

The inflator has a housing with two studs for attachment to a vehicle structure. The heat shield is secured to at least one of said studs. The heat shield has two or more openings for positioning over the at least one stud.

The heat shield is a fabric material with a length and a width and upon assembly to the inflator the length is wrapped a plurality of times about the inflator to form layers and the width of the fabric is sized to extend covering at least a portion of the inflator having gas outlets. The airbag has a neck portion with an opening to receive the inflator with the wrapped heat shield.

BRIEF DESCRIPTION OF THE DRAWINGS

The invention will be described by way of example and with reference to the accompanying drawings in which:

FIG. 7A is an orthogonal view showing the inflating air bag and the up/down direction of the primary gas flow. The horizontal arrow shows the direction of airbag movement into the occupant but one that's slowed in view of the up/down direction of gas flow. The heat shield is shown and the single oval is the airbag.

FIG. 7B is a side view showing the leaning occupant (this was also the case with the top view). The heat shield is also shown in the lower figure, the dotted oval is the airbag as it is inflating, the solid oval "schematically" shows a more fully inflated air bag.

DETAILED DESCRIPTION OF THE INVENTION

Figure 1:
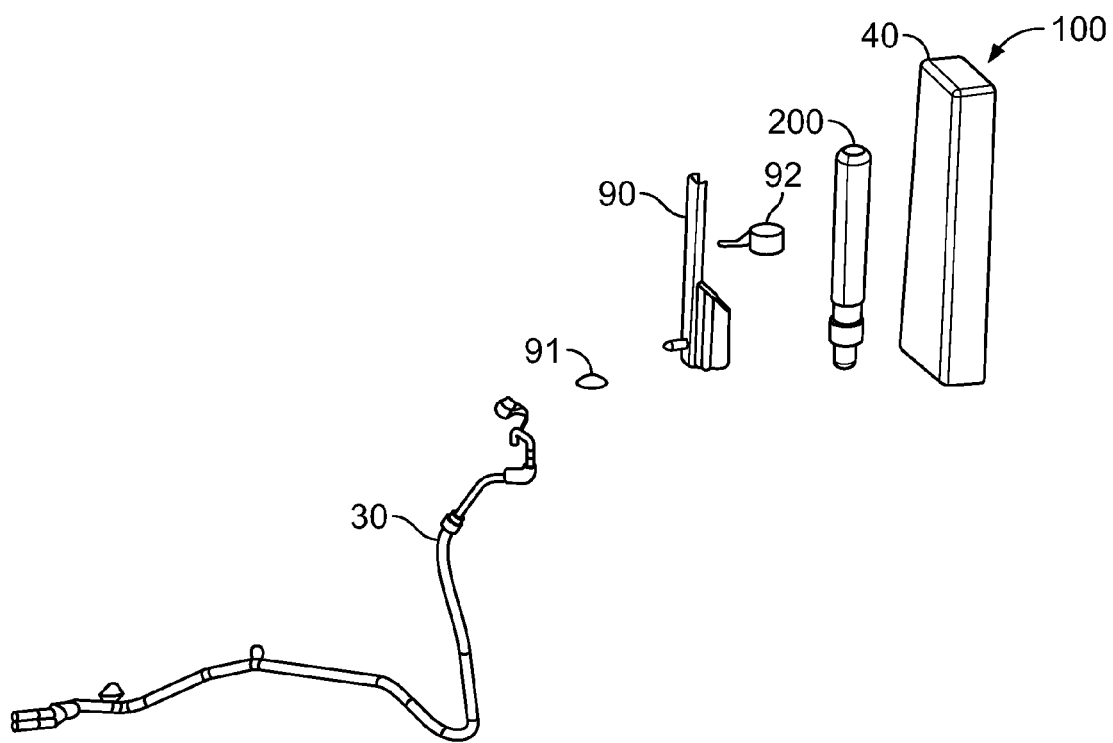
FIG. 1 is a prior art seat mounted airbag assembly shown in an exploded view.

With reference to FIG. 1, a seat airbag assembly 100 is shown in an exploded view. The airbag assembly 100 has a wiring harness 30, a retainer clamp bracket 90, a ring clamp 92 with projecting stud for passing through the retainer clamp bracket 90, a lock washer 91 and an inflator 200. In addition, the airbag cushion 40 is shown in a folded state represented by the rectangular box to the right of the inflator 200. Upon assembly, the inflator 200 is passed into the clamp ring 92 and the nozzle end is inserted through an end of the bracket 90 in such a way to hold it into position; then the entire assembly is connected and mounted into a structure of a vehicle seat. As can be appreciated, these several components require additional manufacturing costs and time during the assembly process.

Figure 2:
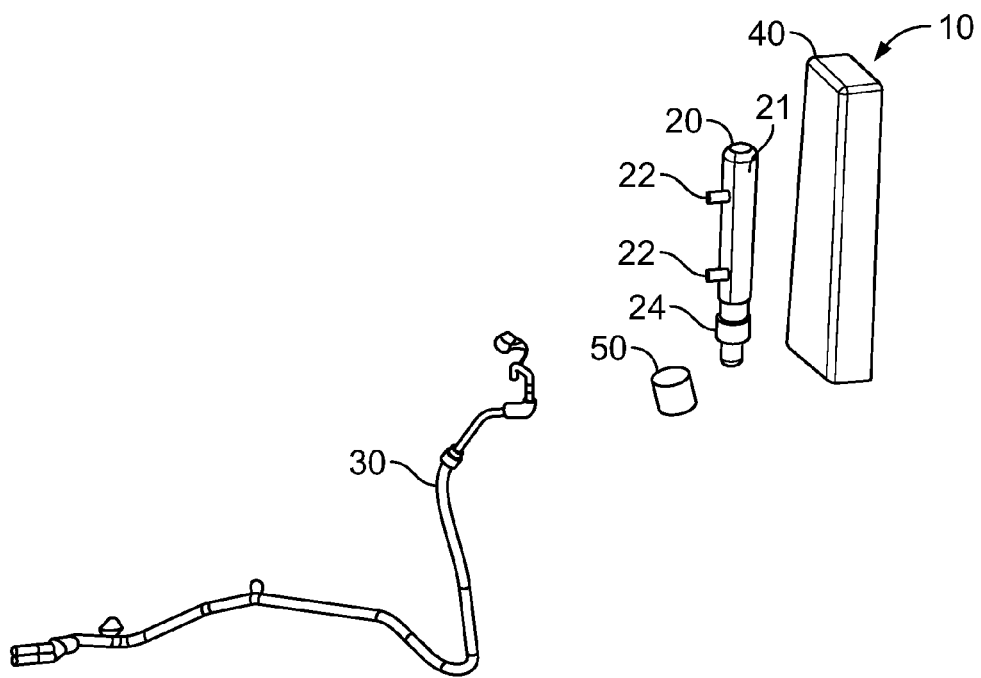
FIG. 2 is a seat mounted airbag assembly of the present invention shown in an exploded view.

With reference to FIG. 2, a new concept for a seat airbag assembly 10 is shown using the same wiring harness 30; however, in this case the inflator 20 has a housing structure 21 with two studs 22 welded to the structure 21 and the airbag cushion 40 is shown again as a rectangular box. This creates an entire assembly 10 for the seat airbag design.

In order to use this new design, it is important that the nozzle end 24 of the inflator 20 be covered or protected in such a fashion that particles and burnt debris do not spew outward during emission of the gas generating inflator 20 that would cause the particles to burn through the airbag cushion 40.

Figure 3:
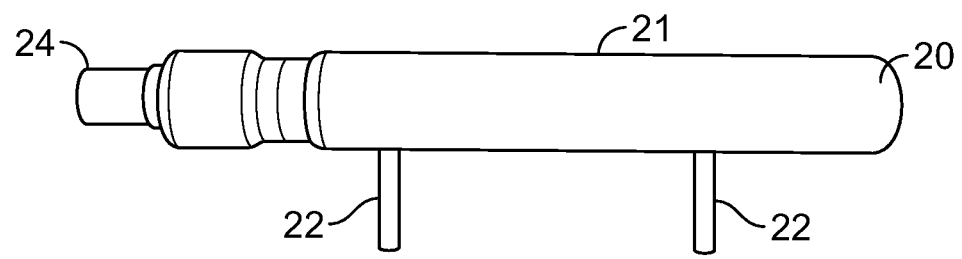
FIG. 3 is a plan view of a tubular inflator with two mounting studs affixed to an inflator housing.

As shown in FIG. 3, an enlarged view of the inflator 20 is shown wherein the studs 22 are shown welded to the housing 21 and at the one end is the gas discharge nozzle 24. It is from this discharge nozzle 24 that the inflation gases spew outward to fill the airbag cushion 40.

Figure 4:
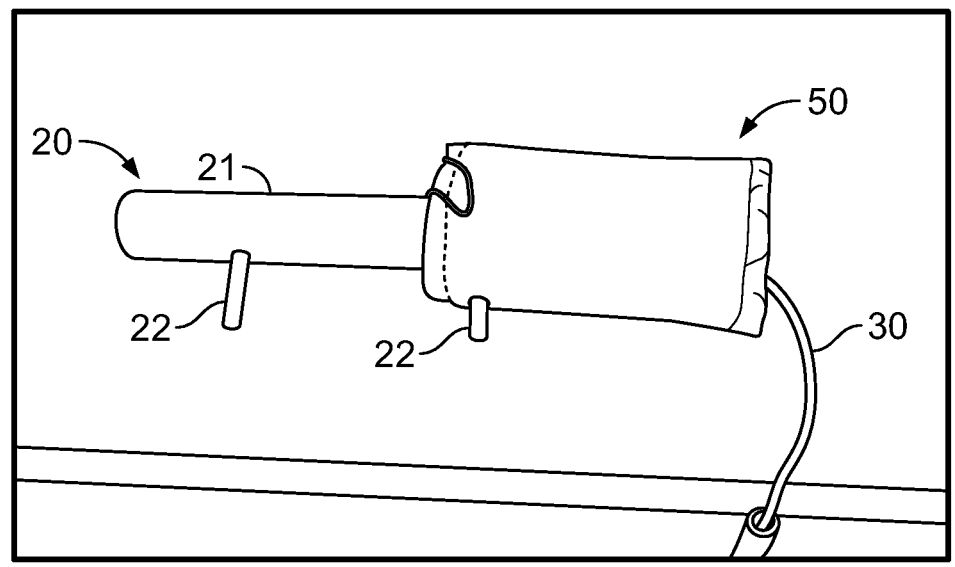
FIG. 4 is a plan view of a tubular inflator with the wrapped heat shield covering the nozzle or gas discharge openings made according to the present invention.

With reference to FIG. 4, a heat shield wrap 50 is shown wrapped about the end of the inflator 20 with the nozzle 24. As shown in FIG. 4, this heat shield wrap 50 encircles the entire nozzle end 24 and is wrapped in several layers; each layer is secured and positioned over a stud 22 on the inflator 20 housing structure 21. This insertion over the stud 22 through openings 52 in the heat shield wrap 50 allows the wrap 50 to be securely positioned on the inflator 20 such that upon assembly to the seat when the studs 22 are bolted to the seat, the heat shield wrap 50 is simultaneously secured to the structure between the seat and the inflator 20.

Figure 5:
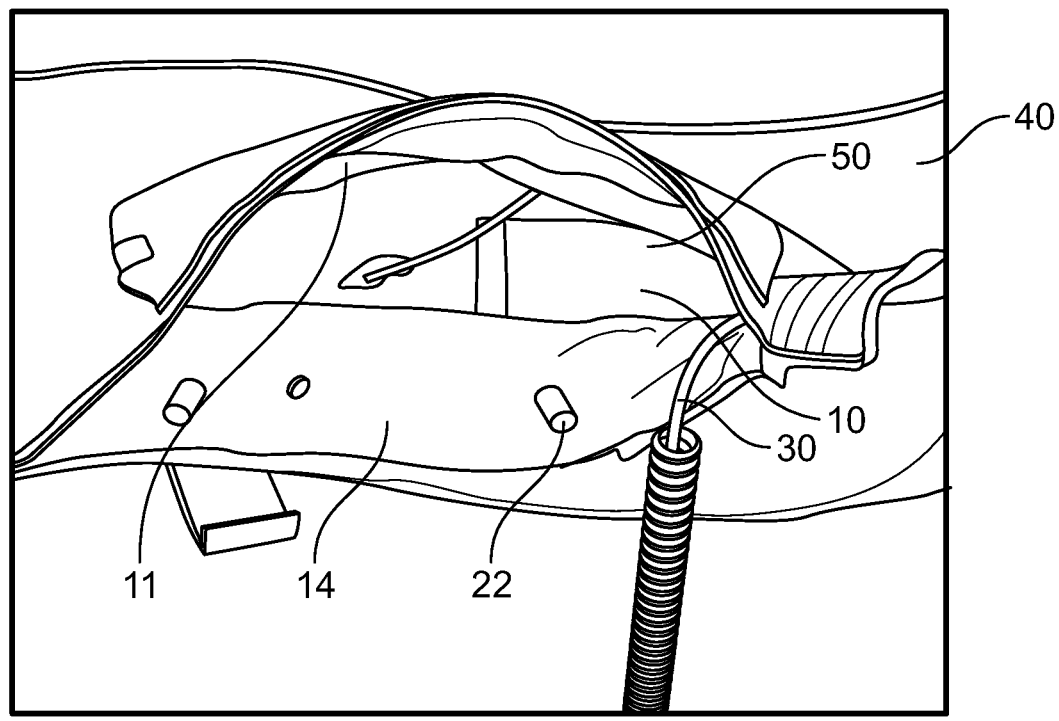
FIG. 5 is an end view showing the neck opening of the airbag with the inflator with a wrapped heat shield positioned inside.

With reference to FIG. 5, to better appreciate how this works the inflator is shown inside the neck 11 of an airbag cushion 40. The inflator 20 with the heat shield wrap 50 is positioned inside the airbag 40, the stud 22 projects through a reinforcement member 14 on the airbag 40 as illustrated to help secure the airbag cushion 40 to the seat assembly. The reinforcement member 14 can use any acceptable method of reinforcement such as an additional layer. In the illustrated embodiment, the reinforcement member 14 is a strap.

Figure 6:
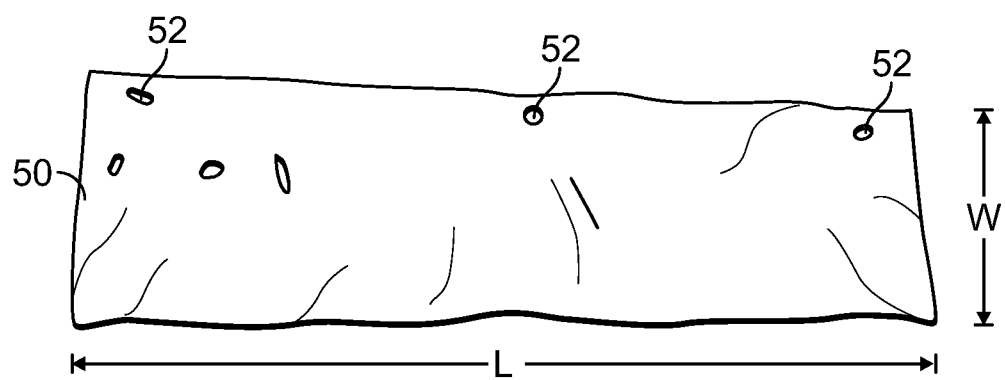
FIG. 6 is a plan view of the unwrapped heat shield showing the length and width of the material.

With reference to FIG. 6, the heat shield wrap 50 is shown in a plan view. As illustrated, there is a plurality of holes 52 spaced in such a fashion that as the heat shield 50 is wrapped about the inflator 20 the holes 52 will align with the stud 22 and will be inserted over the stud 22. This ensures that the entire heat shield wrap 50 can be wound several times about the inflator 20, thus covering that portion of the inflator 20 with the nozzle or gas discharge opening 24.

Upon initiation of the inflator 20, a pyrotechnic squib is fired through the wiring harness 30 in such a fashion that the propellant inside the inflator 20 is ignited generating gases. These gases spew out of the nozzle 24 and burnt particles and other debris may also be ejected from the inflator 20. The heat shield 50, being formed out of a fabric material wound in layers about the inflator 20, creates sacrificial layers that may be destroyed adjacent the inflator 20 as the gases are being discharged; however, due to the fact that the heat shield 50 is wrapped, the gases are not prevented from spewing into the airbag as the wrap can be loosely or semi loosely wound about the inflator 20 so that between the adjacent layers on the inflator 20 there are sufficient gaps to allow the inflation gases to be expelled quickly into the airbag 40, thus not limiting the time to fill the airbag 40, but rather providing tremendous protection against flying burnt particles which impinge the inner layers of the heat shield 50. It is important that the wrap 50 provide not only heat shield protection, but act as a diffuser for the gases exiting the nozzle 24. This diffuser function can greatly be achieved by the tightness of the wrap by having the wrap wound sufficiently tight to keep it secure and yet sufficiently loose so the space between the inflator 20 and the adjacent layers allows the gases to freely permeate out through the ends of the heat shield 50 rapidly when filling the airbag 40.

As can be easily appreciated, the fabric material can be provided as an open woven material that easily lets gas expel or can be provided with some heat shield coating if so desired or believed needed. It is important to understand that the wrap 50 only needs to cover a small portion of the inflator 20, that portion that allows the escaping gases to exit the device. As a result, it is believed that if the length of the fabric is sufficient to wrap two or more times, preferably three or more times, then a sufficient number of layers will be achieved. The width accordingly only needs to be as wide as needed to cover the escaping gases. As shown in the exemplary of FIG. 6, the length is approximately 330 mm and the width is approximately 60 mm. The width and length dimensions are only one example, these dimensions can be any suitable measurement for the particular application being used to provide the necessary heat shielding capability. As shown openings 52 are provided along the length so that the wrap 50 can be secured over the studs 22. These openings 52 are approximately 6.5 mm in diameter and will fit over the studs 22 very conveniently. These dimensions are exemplary and it is understood can vary based on the shape and size of the inflator 20.

Figure 7A:
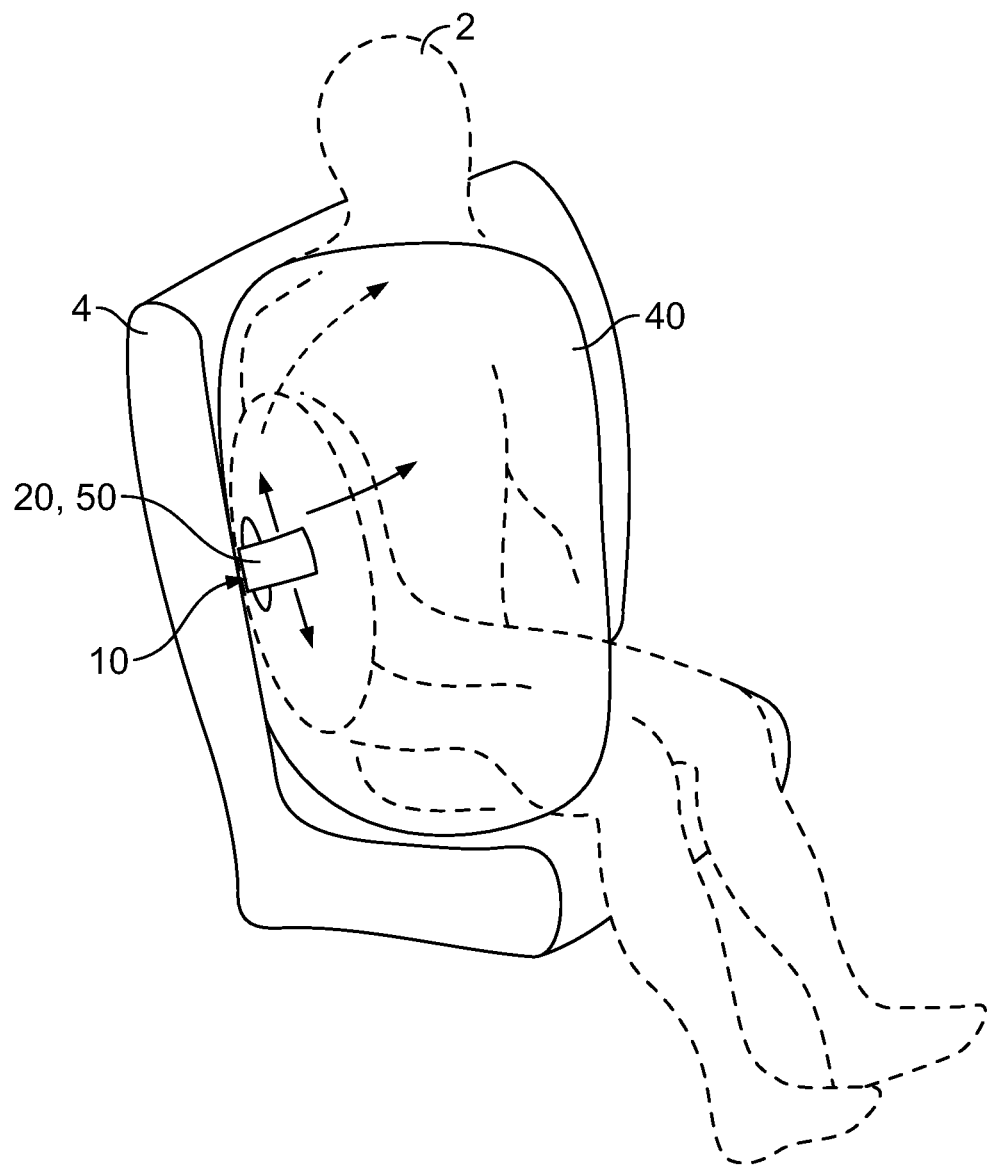
FIGS. 7A and 7B are illustrations of a deploying airbag gas flow from the inflator with a wrapped heat shield according to the present invention.
Figure 7B:
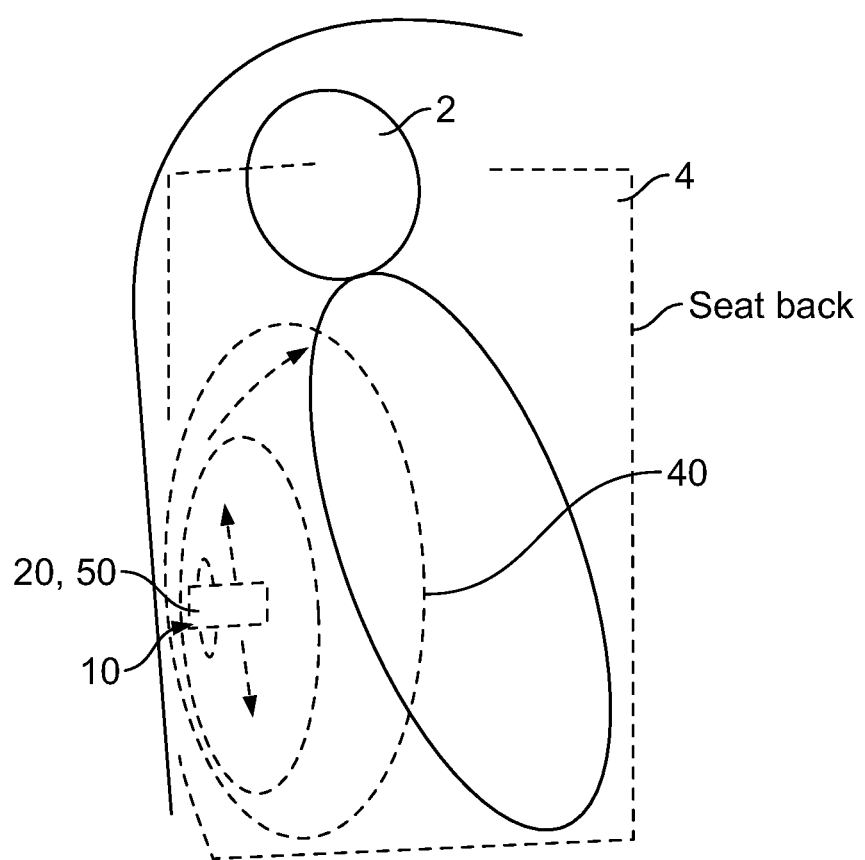

This invention has benefit with an out-of-position occupant 2, for example one seated on a seat 4 leaning on a window. The looped construction of the heat shield urges inflation gas to flow up and down and avoids accelerating the bag toward the occupant in view of the directions of gas flow. Therefore, this wrapped fabric works as a countermeasure to direct the deploying airbag 40 acceleration up and down as inflation gases flow outward of the inflator 20 and wrapped heat shield 50 as shown in FIGS. 7A and 7B.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An airbag assembly (10) comprising:
   an airbag (40);
   a tubular inflator (20); and
   a rolled heat shield (50) wrapped about the inflator (20) and interposed between the inflator (20) and the airbag (40) wherein the inflator (20) has a gas outlet nozzle (24) for releasing gas from the inflator (20) and wherein the heat shield (50) is wrapped about said nozzle (24), and encircling the entire nozzle so as to function as a diffuser for the gases exiting the nozzle wherein the heat shield (50) is a fabric material, the fabric material is made in layers or wrapped about the inflator (20) a plurality of times to form layers, the inner layers are sacrificial layers destroyed as inflation gases are expelled, the diffuser function being achieved by the tightness of the wrapped layers being sufficiently loose so a space between the inflator and the adjacent layers allows the gases to freely permeate through the end of the heat shield when filling the airbag.

2. The airbag assembly (10) of claim 1 wherein the portion of the inflator (20) wrapped by the heat shield (50) includes one or more gas outlets (24).

3. The airbag assembly (10) of claim 1 wherein the fabric material is a synthetic, natural or glass fiber reinforced material.

4. The airbag assembly (10) of claim 1 wherein the inflator (20) has a housing (21) with two studs (22) for attachment to a vehicle structure.

5. The airbag assembly (10) of claim 4 wherein the heat shield (50) is secured to at least one of said studs (22).

6. The airbag assembly (10) of claim 5 wherein the heat shield (50) has two or more openings (52) for positioning over the at least one stud (22).

7. The airbag assembly (10) of claim 6 wherein the heat shield (50) is a fabric material with a length and a width and upon assembly to the inflator (20) the length is wrapped a plurality of times about the inflator (20) to form layers and the width of the fabric is sized to extend covering at least a portion of the inflator (20) having gas outlets (24).

8. The airbag assembly (10) of claim 1 wherein the airbag (40) has a neck portion with an opening to receive the inflator (20) with the wrapped heat shield (50).

9. A side airbag assembly (10) comprising:
   an airbag cushion (40) with a neck region;

a tubular inflator (20) for placement into the neck region, the inflator (20) having one or more mounting studs (22) for attachment to a vehicle seat; and a rolled heat shield (50) wrapped about a portion of the inflator (20) with one or more of the mounting studs (22) extending through the rolled heat shield (50) fixing it to the inflator (20), and wherein the inflator (20) has a gas outlet nozzle (24) for releasing gas from the inflator (20) and wherein the heat shield (50) is wrapped about said nozzle (24) and encircling the entire nozzle so as to function as a diffuser for the gases exiting the nozzle wherein the heat shield (50) is a fabric material wherein the fabric material is made in layers or wrapped about the inflator (20) a plurality of times to form layers, wherein the inner layers are sacrificial layers destroyed as inflation gases are expelled, the diffuser function being achieved by the tightness of the wrapped layers being sufficiently loose so a space between the inflator and the adjacent layers allows the gases to freely permeate through the end of the heat shield when filling the airbag.

10. The side airbag assembly (10) of claim 9 wherein the portion of the inflator (20) wrapped by the heat shield (50) includes one or more gas outlets (24).

11. The side airbag assembly (10) of claim 9 wherein the fabric material has a 840 denier or greater.

* * * * *